United States Patent
Boucher et al.

(10) Patent No.: US 10,112,357 B2
(45) Date of Patent: Oct. 30, 2018

(54) METHOD FOR MAKING A HOLLOW OBJECT

(71) Applicant: SALOMON S.A.S., Metz-Tessy (FR)

(72) Inventors: Béatrice Boucher, Chilly (FR); Gérard Gautier, Yens (CH)

(73) Assignee: SALOMON S.A.S., Metz-Tessy (FR)

( * ) Notice: Subject to any disclaimer, the term of this patent is extended or adjusted under 35 U.S.C. 154(b) by 151 days.

(21) Appl. No.: 14/392,184

(22) PCT Filed: Jun. 25, 2014

(86) PCT No.: PCT/FR2014/000143
§ 371 (c)(1),
(2) Date: Dec. 23, 2015

(87) PCT Pub. No.: WO2014/207325
PCT Pub. Date: Dec. 31, 2014

(65) Prior Publication Data
US 2016/0185062 A1    Jun. 30, 2016

(30) Foreign Application Priority Data

Jun. 25, 2013 (FR) .................... 13 01485

(51) Int. Cl.
*B29D 35/14*     (2010.01)
*B29C 70/34*     (2006.01)
*B29D 22/00*     (2006.01)
*B29C 70/04*     (2006.01)
*A43B 7/12*      (2006.01)
(Continued)

(52) U.S. Cl.
CPC ............. *B29D 35/146* (2013.01); *A42B 3/06* (2013.01); *A43B 7/12* (2013.01); *A43B 23/0215* (2013.01); *A43B 23/0235* (2013.01); *A43B 23/0255* (2013.01); *A43B 23/04* (2013.01); *A43B 23/042* (2013.01); *B29C 70/04* (2013.01); *B29C 70/342* (2013.01); *B29D 22/00* (2013.01); *B65D 1/40* (2013.01); *B29K 2101/12* (2013.01);
(Continued)

(58) Field of Classification Search
None
See application file for complete search history.

(56) References Cited

U.S. PATENT DOCUMENTS

| 6,796,784 B1 | 9/2004 | Andre |
| 2006/0197250 A1 | 9/2006 | Shimada et al. |
| 2010/0016991 A1 | 1/2010 | Hellberg |

FOREIGN PATENT DOCUMENTS

| FR | 2 792 246 A1 | 10/2000 |
| WO | WO-00/38905 A1 | 7/2000 |
| WO | WO-2008/036034 A1 | 3/2008 |

*Primary Examiner* — Monica A Huson
(74) *Attorney, Agent, or Firm* — Greenblum & Bernstein, P.L.C.

(57) ABSTRACT

Method for manufacturing a hollow object from a material comprising threads mechanically linked to one another to form a first shell. The method comprises a reference step that involves shaping the first shell on a support, a first step, subsequent to the reference step, that involves covering the first shell with a sealed membrane and obtaining a pressure difference on opposite sides of the membrane, the pressure on the side of a surface of the membrane in contact with the first shell being less than the pressure on the side of a free surface of the membrane, and a second step, simultaneous with and/or following the first subsequent step, that involves causing a change of state and/or the bonding of some or all of the threads forming the first shell.

25 Claims, 10 Drawing Sheets

(51) Int. Cl.
    *A43B 23/02*      (2006.01)
    *A43B 23/04*      (2006.01)
    *A42B 3/06*       (2006.01)
    *B65D 1/40*       (2006.01)
    *B29L 31/48*          (2006.01)
    *B29L 31/50*          (2006.01)
    *B29K 101/12*         (2006.01)
    *B29K 675/00*         (2006.01)
(52) U.S. Cl.
    CPC ... *B29K 2675/00* (2013.01); *B29L 2031/4821* (2013.01); *B29L 2031/50* (2013.01)

METHOD FOR MAKING A HOLLOW OBJECT

BACKGROUND

1. Field of the Invention

The invention relates to a method for manufacturing a hollow object, such as an article footwear, a helmet, a bag, a sports accessory, or the like, the object including synthetic materials. The invention also relates to a product containing the object obtained by the method.

2. Description of the Background

Conventionally, hollow objects, such as footwear, are manufactured by combining an upper and a sole assembly. The upper generally includes a number of parts, such as a lateral quarter, a medial quarter, a vamp, a tongue, a heel, a rear counter, a protective toe-cap, a tightening device including keepers and a lace, an inner lining, and may even include additional parts. Moreover, some of these parts may include a plurality of portions. The main problem in a traditional shoe is in assembling and turning parts that are cut and flat assembled into a three-dimensional shape. Conventionally, the upper is associated with a lasting sole to demarcate a footwear element. According to a first method, the upper is bonded to the lasting sole using an adhesive layer. The lasting sole, also referred to as the lasting board, is relatively rigid to withstand the lasting process. The bonding operation is carried out by pulling the upper and pressing it flat onto the lasting board, with a last positioned in the upper. This is the traditional shoe lasting assembly. This technique makes it possible to exert sufficient pressure when heating the adhesive in order to produce the footwear element. A second method, also known, involves producing the footwear element by stitching the upper to the lasting board. This is referred to as the Strobel assembly. The lasting board in this case is a flexible stitchable sole, referred to as the Strobel sole. For each of the first and second methods, the lasting board is integral with the sole assembly. The sole assembly further comprises external parts, such as one or more damping layers and a wear layer adapted to contact the ground, which are generally attached with an adhesive to the lasted board and upper. The sole assembly further comprises one or more inner layers arranged in the footwear element to fulfill protective functions in terms of hygiene, shock absorption, arch support, or the like. In the end, the association of the footwear element with the other constituent parts of the sole assembly forms the shoe.

Irrespective of the method used for its manufacture, a traditional shoe has certain drawbacks. First, the shoe uses a large number of parts, typically between forty and sixty parts. Such a large number of shoe-forming parts increases the number of manufacturing operations and the time required to carry out such operations. It usually takes forty minutes to one hour and thirty minutes to make a shoe. It can be said that the shoes made using conventional techniques are complicated, both by the number of their components and the number of manufacturing operations.

Another disadvantage results from the structural discontinuity of the shoe, in particular in the area of the upper. For example, a part of reduced size, superimposed on another, larger part, may sometimes considerably modify the bendability of the upper in the location of the small part. This may sometimes hinder a user and makes the shaping of the shoe, that is, the three-dimensional shaping, more difficult.

A further disadvantage is due to the presence of free spaces between the foot and the shoe. This means that the foot is not in contact with the upper or the sole assembly in certain areas. This is especially true in the area of certain portions of the junction between the upper and the lasting board. As a result, undesired displacements occur sometimes between the foot and the shoe, which can cause discomfort or injuries.

Finally, it can be said that a traditional shoe does not always ensure support and/or adequate tightening of the foot, or does not always provide satisfactory comfort for the foot. Moreover, this shoe does not systematically conform to all foot deformations.

In view of the foregoing, a development has been to provide an improved article of footwear. The latter, according to the noted development, comprises a first shell, the first shell extending lengthwise from a rear end to a front end, widthwise between a lateral side and a medial side, and height-wise from a base to an upper end, the first shell including threads linked to one another mechanically, at least some of the threads comprising at least one hot-melt filament. The threads comprising at least one hot-melt filament are distributed over the entire first shell, and the shape of the first shell is set by melting the threads comprising at least one hot-melt filament.

As a consequence of this arrangement, the first shell can be shaped to have a geometry that is very similar to that of a foot and thereby conforms to the foot in a very uniform fashion. This means that the foot is in contact, or at least very close to, the first shell. This results in an evenly distributed support of the foot, and very few undesired displacements, or even no displacements, between the foot and the first shell. A resulting advantage is increased comfort of the article of footwear produced by the development, compared to a traditional shoe.

Another consequence of the arrangement according to the development is that the first shell has structural continuity, in the sense that its inner surface and/or outer surface are substantially uniform. Physical properties of the first shell, such as bending, for example, may vary depending on zones of the shell. This results in less discomfort for the user.

A synthesis of the foregoing shows that the first shell supports the foot and provides adequate comfort therefor. Furthermore, the first shell is capable of conforming to the foot deformations. This enables the article of footwear to fit comfortably in any situation, be it a static or dynamic situation.

A further consequence of the development is the reduced number of parts for manufacturing the article of footwear, although it may be provided with a few additional parts. The first shell in itself is a minimalist assembly compared to a traditional footwear element. The first shell from the development is a unitary element which, by itself, replaces at least the lateral and medial quarters, a vamp, a tongue, a rear counter, a lasting board, or even more parts. As a corollary, the development considerably reduces the number of manufacturing operations and the time required to carry them out. It generally takes less than thirty minutes to produce a shoe according to the development. The resulting advantage is that the article footwear is much simpler, in any sense, than a traditional shoe. The structural simplicity of the development does not reduce the number of technical functions performed by the article of footwear, compared to a traditional shoe. Paradoxically, one can even say that the structure simplicity is a source of technical improvements in terms of quality and quantity.

Nevertheless, it has been observed that disadvantages remain, despite these improvements. This is the case with respect to quality, for example, which is still insufficient. This means that for the above-mentioned development, the first shell sometimes has manufacturing defects. An example of a defect is unevenness in the fusion of the threads, which results in one or more localized alterations of the physical or mechanical properties of the shell. In this case, the shell locally has different properties than those desired. Without limitation, it may be elasticity, porosity, resistance to wear, or the like. Another example of defect is a localized alteration of the shape or appearance. This is particularly the case if the shell is locally pleated. This is essentially a cosmetic but annoying defect in the sense that it prevents the sale of the product.

SUMMARY

In view of the foregoing, the invention improves upon the manufacture of a hollow object, that is, the invention produces the object with better quality, by maintaining characteristics of structural continuity, simplicity, speed of implementation; and by maintaining the number of technical functions performed by the object, compared to the prior art equivalent. Quality needs to improve in the sense that manufacturing defects should be substantially or completely nonexistent.

The method according to the invention can be used for various objects, such as articles of footwear, helmets, bags, or the like.

Accordingly, the invention provides a method for manufacturing a hollow object from a material comprising threads linked to one another mechanically to form a first shell.

The method according to the invention comprises a reference step that involves shaping the first shell on a support, and a first step, subsequent to the reference step, that involves covering the first shell with a sealed membrane and obtaining a pressure difference on opposite sides of the membrane, the pressure on the side of a surface of the membrane in contact with the first shell being less than the pressure on the side of a free surface of the membrane, the method further comprising a second step, simultaneous with and/or following the first subsequent step, that involves causing a change of state and/or the bonding of some or all of the threads forming the first shell.

The manufacturing method according to the invention enables the application of a uniform pressure on the first shell. In other words, the method involves biasing the first shell in its entirety to press it on the support. As a corollary, the method prevents a subdivision of the shell from remaining apart from the support, by locally having a different curvature than the opposite subdivision of the support. This prevents in particular the formation of blisters, wrinkles, or other asperities. It follows that the first shell has a smooth surface, in the sense that it faithfully reproduces the shape of the support. It also follows that the change of state and/or bonding of some or all of the threads is much more even, even flawless. Among the resulting advantages, notable are the structural continuity of the object obtained, as well as the simplicity and speed of implementation of the method. Manufacturing defects are substantially or completely nonexistent. In general, the method according to the invention improves the manufacture of a hollow object.

BRIEF DESCRIPTION OF THE DRAWINGS

Other characteristics and advantages of the invention will be better understood from the following description, with reference to the annexed drawings illustrating, by way of non-limiting embodiments, how the invention can be achieved, and in which.

DETAILED DESCRIPTION

The first embodiment described hereinafter relates for example to a method for manufacturing an article of footwear, which can be configured for walking or running on flat or mountainous terrain. However, the first embodiment is not limiting, and it is shown below that the manufacturing method can be implemented for other hollow objects.

The first embodiment is described below with reference to FIGS. 1 to 10.

As can be understood with reference to FIGS. 1 to 4, the hollow object is made from a material comprising threads linked to one another mechanically to form a first shell 1. The hollow object is an article of footwear, for which the first shell 1 extends lengthwise along a longitudinal direction L from a rear end 4 to a front end 5; widthwise along a transverse direction W, between a lateral side 6 and a medial side 7; and height-wise from a base 8 to an upper end 9. This enables the first shell to surround and support the user's foot.

Figure 1:
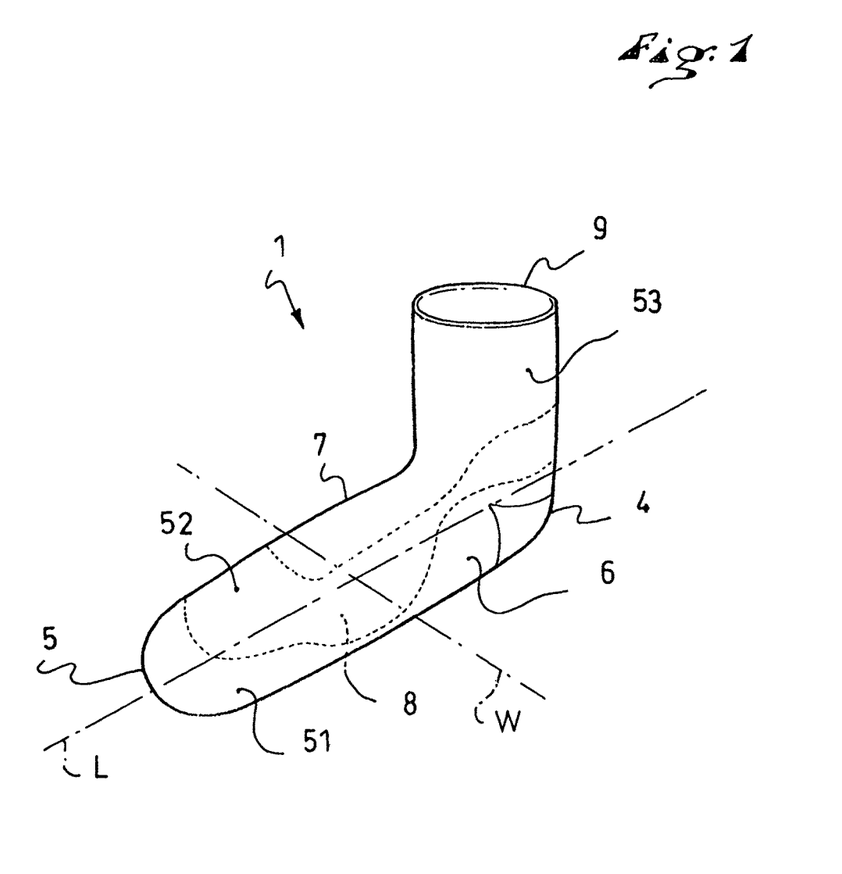
FIG. 1 is a front perspective view of the top side of the first shell of an article of footwear, according to a first embodiment of the invention.
Figure 2:
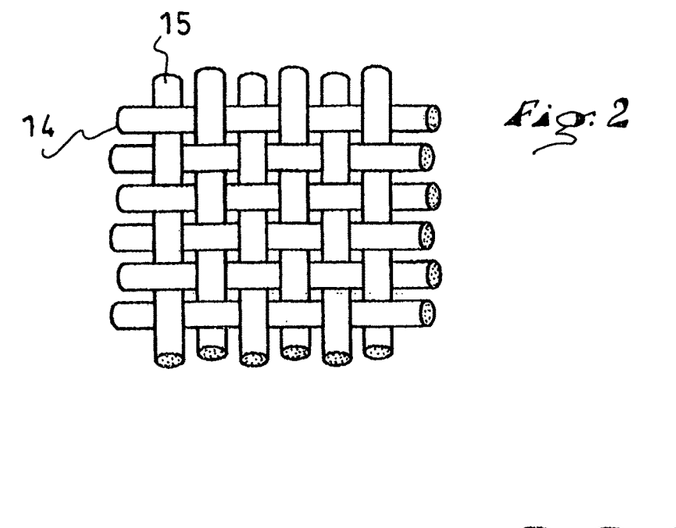
FIG. 2 is a schematic view related to the formation of the first shell of FIG. 1.
Figure 3:
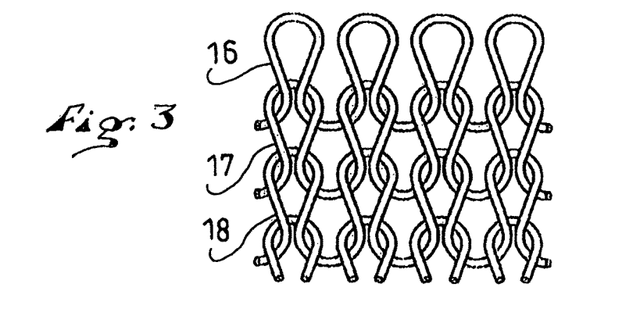
FIG. 3 is another schematic view related to the formation of the first shell of FIG. 1.
Figure 4:
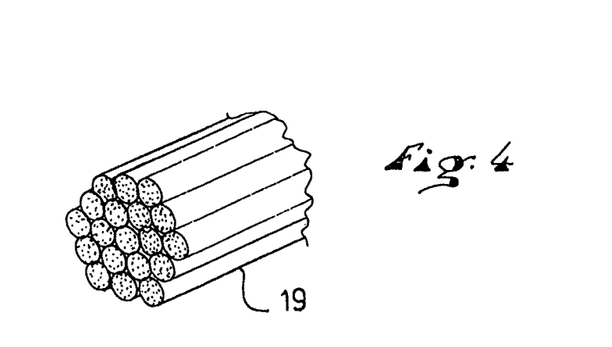
FIG. 4 is another schematic view related to the formation of the first shell of FIG. 1.

The shell 1 is obtained by making a sleeve, that is, a flexible tube made of threads linked to one another mechanically. The association of the threads used to make the sleeve 1, and therefore the shell, is presented with reference to FIGS. 2 and 3. Generally speaking, the threads are provided to be associated with one another using any suitable textile technique, such as knitting, weaving, braiding, or the like. In the case of knitting, it is possible to use a single-knit or double-knit circular knitting machine, a cylinder knitting machine, or a flat knitting machine. Two knitting zones can be joined to one another using the intarsia knitting technique or embroidery. Various decorative patterns can be obtained directly during knitting with the intarsia method, embroidery, the Jacquard knitting technique or the like. FIG. 2 shows a conventional weaving with first threads 14 oriented along a first direction, second threads 15 oriented along a second direction, the first 14 and second 15 threads intersecting to form a flexible mesh. FIG. 3 shows a knitting with three threads 16, 17, 18 arranged in interpenetrating loops. However, a number of other arrangements are possible.

The meaning of a thread within the context of the invention will next been described.

First, a thread can be a monofilament produced, for example, by extruding a hot-melt synthetic material such as polyamide, polyurethane, polyethylene, or any equivalent or similar material. The production of a filament is continuous, in a way comparable to a silk filament produced by a spider. The filament can be a mono-component or mono-material, in the sense that its transverse cross section is uniform. However, the filament can also be multi-component, for example bi-component. In this latter case, a transverse cross section of a filament shows a core comprised of a first material, and a peripheral shell surrounding the core, such shell being comprised of a second material. Each material can be hot-melt, or only one material can be hot-melt, or, in certain cases, no material is hot-melt. If both materials are hot-melt, their melting temperatures are different.

Then the thread can be multifilament. In this case, it is produced by combining a plurality of filaments. Such an association is shown using the diagram of FIG. 4. Here, all of the filaments 19 are of the same type, in the sense that each has the same melting point. But combinations of various types of filaments can be provided, some of which can be fusible and others not, or they can have different melting points. The filaments are associated with one another by any known technique.

Also, the thread can be produced in the form of a fiber mesh. Here, a fiber is a filament of limited length. The fibers are associated in tight contact to form the mesh, by any known technique, and in particular by twisting. Retaining the fibers to one another is traditionally done by friction, especially with natural fibers such as cotton. However, for the invention, retaining the fibers to one another occurs either by friction or by a combination of friction and melt-adhesion, or yet entirely by adhesion.

The use of the sleeve 1, or shell, can now be explained for the manufacture of the article of footwear, with reference to FIGS. 1-10.

According to the invention, and with particular reference to FIGS. 5-9, for example, the method for manufacturing the hollow object, namely the article footwear in this case, comprises a reference step that involves shaping the first shell 1 on a support 21, and a first step, subsequent to the reference step, that involves covering the first shell 1 with a sealed membrane 22 and obtaining a pressure difference on opposite sides of the membrane, the pressure on the side of a surface 23 of the membrane 22 in contact with the first shell 1 being less than the pressure on the side of a free surface 24 of the membrane, and it comprises a second step, simultaneous with and/or following the first subsequent step, that involves causing a change of state and/or the bonding of some or all of the threads 14, 15, 16, 17, 18 constituting the first shell 1.

Through this method, a uniform pressure is applied to the shell 1, which is itself fully biased toward the support 21. This makes it possible to accurately reproduce the shape of the support, that is, its geometry. In this sense, the surface of the shell 1 is smooth. This results advantageously in a high manufacturing standard. In particular, the rejection rate is low or even zero.

Figure 5:
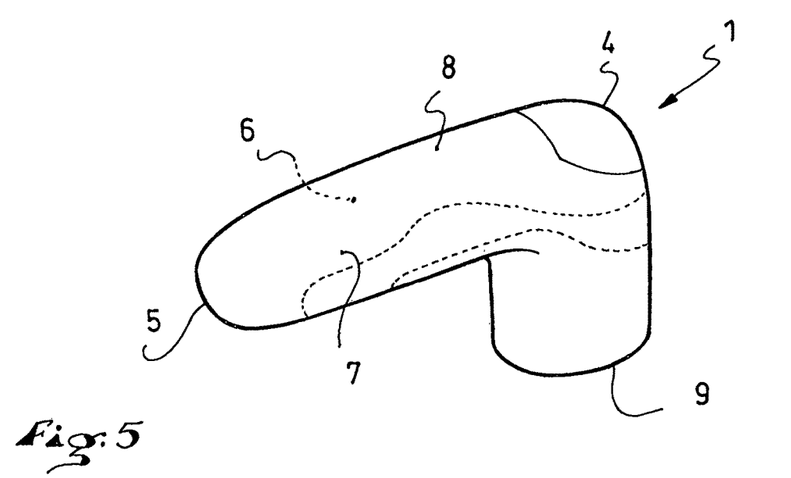
FIG. 5 is a perspective view showing the first shell of FIG. 1 brought close to a last which serves as a support.
Figure 6:
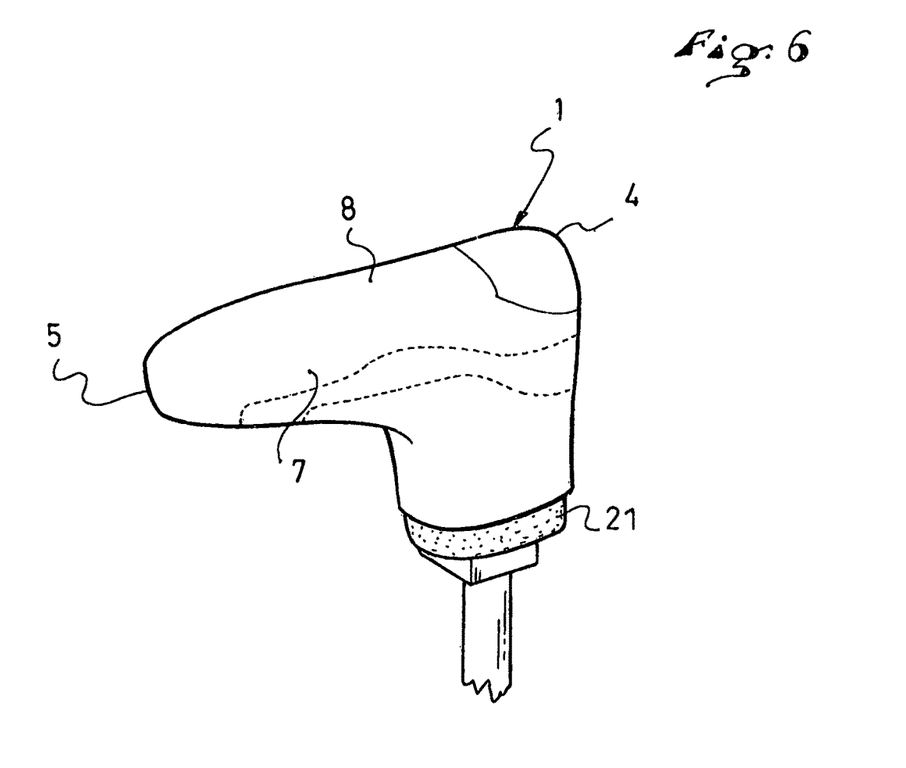
FIG. 6 is a perspective view showing the first shell of FIG. 1 positioned on the support.

As shown initially in FIG. 5, the support 21 reproduces the volume of a foot, or the volume of a foot in combination with the volume of a portion of the lower leg. In the profession involved, that of manufacture of articles of footwear, the support 21 is traditionally referred to as the last. To produce an article of footwear, the first shell 1 is brought close to and then positioned on the last, or support 21, as can be understood with reference to FIGS. 5 and 6. The positioning can be done by hand or by using any moving device.

Figure 7:
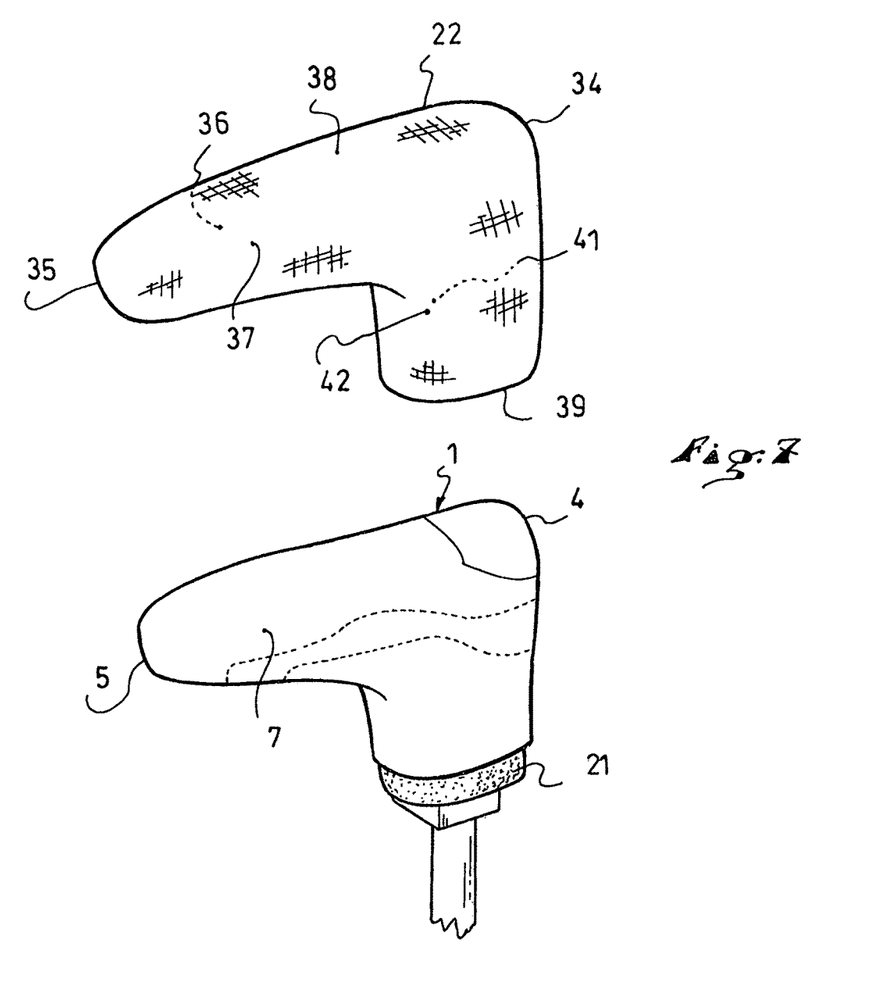
FIG. 7 is a perspective view showing a membrane brought close to the assembly comprising the support and the first shell, according to FIG. 6.

It can be further observed in FIG. 7 that the sealed membrane 22 is in turn brought close to the support 21 in order to cover both the latter and the previously positioned shell 1. In a non-limiting fashion, the membrane 22 has the general shape of the object, in this case the general shape of the support 21 or of the article of footwear. The membrane 22 is therefore a hollow body which, by analogy, extends lengthwise from a rear end 34 to a front end 35, widthwise between a lateral side 36 and a medial side 37, and heightwise from a base 38 to an upper end 39. The membrane 22 has a contact surface 41 provided to cover the shell 1. The contact surface 41 is therefore an inner surface of the hollow body formed by the membrane 22. As a corollary, the membrane 22 has a free surface 42 which is an outer surface 42 of the hollow body. The thickness of the membrane 22 is the distance separating these two surfaces 41, 42.

The membrane is made of any suitable material. For example, the membrane comprises silicone, reinforced or not reinforced, polyurethane, rubber, or the like. The thickness of the membrane is between 0.1 mm and 5.0 mm and, in a particular embodiment that yields good results, between 0.8 mm and 3.0 mm. More specifically, but without limitation, a membrane comprised of silicone, reinforced or not reinforced, and whose thickness is between 0.8 mm and 3.0 mm, yields good results. More precisely, the term "reinforced" refers herein to an additional material, such as a powder used as filler, which is mixed with silicone. More broadly, any material used to make the membrane 22 can be reinforced.

The preceding can be summarized in that the sealed membrane 22 comprises an elastically reversibly deformable synthetic material. The membrane 22 can therefore be easily positioned on the support 21 and, as shown below, can be easily biased in order to press the first shell 1 onto the support.

Figure 8:
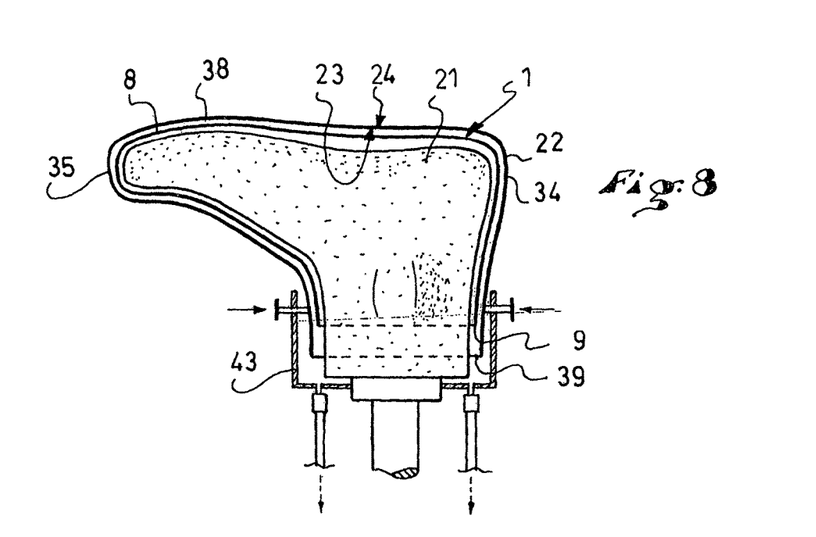
FIG. 8 is a schematic side view showing the first shell and the membrane both positioned on the support.

An assembly comprising the support 21, the shell 1, and the membrane 22 is shown schematically in cross section in FIG. 8. The first shell 1 is shown covering the support 21, and the membrane 22 covering the first shell. In order to apply the first shell 1 onto the support 21, a coupling 43 connects the membrane 22 to a device provided for creating vacuum; the device is not shown because it is well-known to one with ordinary skill in the art. In a non-limiting fashion, the coupling 43 is connected to the sealed membrane 22, in the area of the upper end 39. The upper end 9 of the shell 1 is set back with respect to the upper end 39 of the membrane.

According to the first embodiment, the pressure difference on opposite sides of the membrane 22 is achieved by reducing the pressure on the side of the contact surface 23 of the membrane. This involves removing the air present in the membrane, via the coupling 43, thereby enabling atmospheric pressure to press the membrane 22 and the shell 1 onto the last or support 21. This process is simple, because most manufacturing facilities have machines for creating vacuum.

Figure 9:
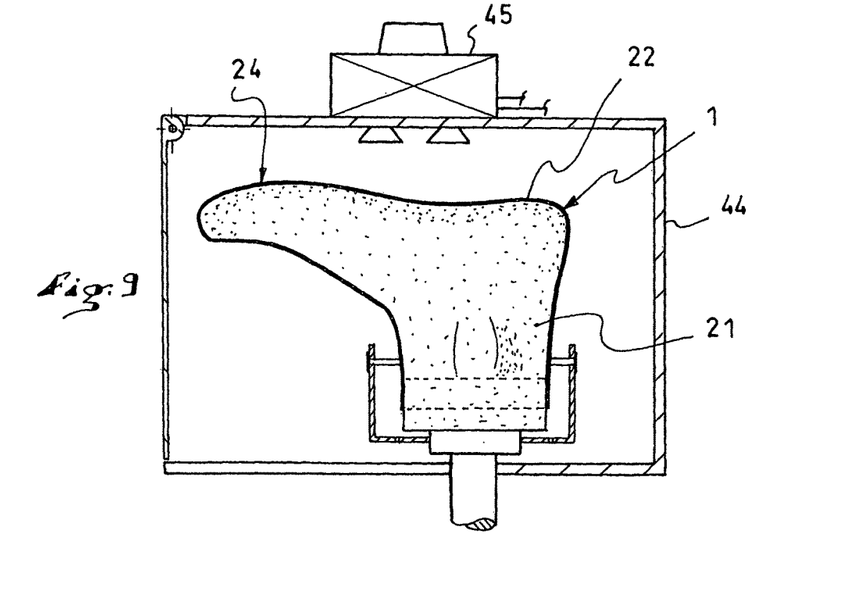
FIG. 9 is a schematic side view showing an assembly comprising the support, the first shell and the membrane, inside an enclosure.

Differently but still according to the first embodiment, as shown schematically in cross section in FIG. 9, the pressure difference on opposite sides of the membrane is obtained by increasing the pressure on the side of the free surface 24 of the membrane 22. Here, an assembly comprising the support 21, the shell 1 and the membrane 22 is positioned in an enclosure 44. A coupling 45 connects the enclosure to a device provided for varying the pressure, which can be increased or decreased. This device is neither described nor shown, as it is well known to one with ordinary skill in the art. The pressure in the enclosure can be increased from 1 to 10 bars, and values between 2 and 6 bars yield good results. The pressure biases the membrane and the shell against the last 21. This process is also simple.

Also differently but still according to the first embodiment, and although not shown, it is possible to combine the two processes presented above. This means that the pressure difference on opposite sides of the membrane is obtained by a combination of reduced pressure on the side of the contact surface 23 with increased pressure on the side of the free surface 24 of the membrane. The process efficiency only gets better.

It is therefore possible to use different means to carry out the first step of the method, following the reference step. The second step of the method can also be carried out in different ways, as described below.

Without limitation, and still according to the first embodiment, at least some of the threads 14, 15, 16, 17, 18 comprise at least one hot-melt filament 19. Thus, as further described below, the constituent material of the shell 1 directly contributes to obtaining the final shape of the article of footwear. In other words, this material makes it possible to preserve the appearance provided by the support 21.

The change of state of some or all of the threads forming the first shell 1 is carried out through energy supply. This actually involves obtaining a more or less marked fusion of part or all of the shell to impart the desired specific geometry and properties thereon. These properties can be resistance to abrasion, rigidity, or the like, for example.

Logically, in relation to the fact that at least some of the threads comprise at least one hot-melt filament, the change of state of some or all of the threads forming the first shell 1 is carried out by increasing the temperature. This advantageously involves a simple implementation operation.

For example, the temperature increase is carried out by radiation, which is energy propagation in the form of waves or particles, such as infrared radiation, or the like. The means for raising temperature is easy to implement.

As another example, the temperature increase is carried out by convection. This can be achieved by circulating hot fluid in contact with the assembly comprising the support 21, the shell 1, and the membrane 22. Again, the arrangement for raising the temperature is simple.

As yet another example, the temperature increase is carried out by conduction. In a non-limiting manner, one or more heated flexible pads can be provided for pressing the support 21 through the shell and membrane. This is an arrangement that acts by contact instead.

Figure 10:
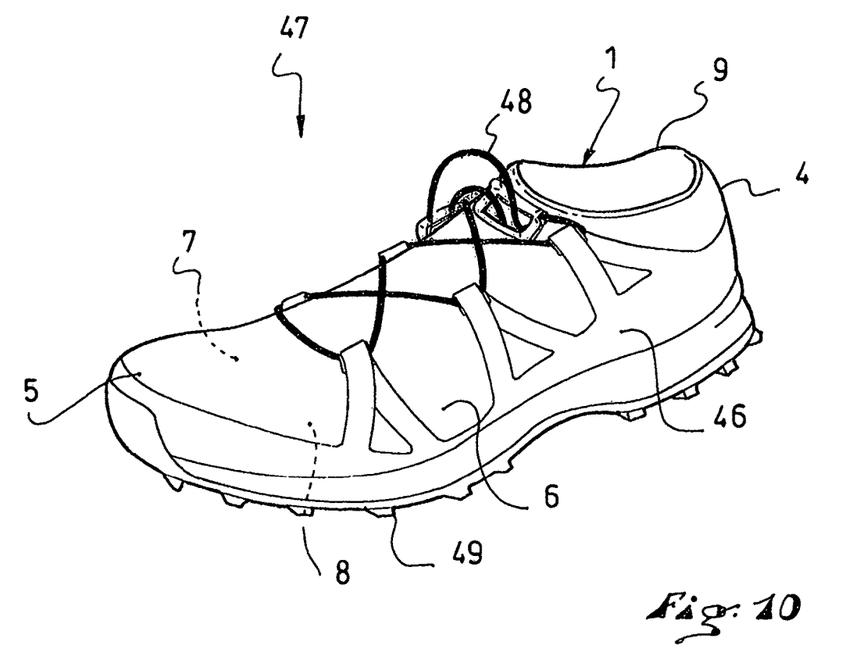
FIG. 10 is a perspective front, top view of an article of footwear comprising the first shell shown in FIGS. 1 to 9.

Still according to the first embodiment, and in a non-limiting manner, as can be understood with reference to FIG. 10, the manufacturing method comprises a step that involves incorporating a reinforcement 46 into the object, in this case a shoe or an article of footwear 47, which has the general appearance of the first shell 1. The reinforcement 46 reinforces the shoe 47 in the zones in which it is opposite the first shell 1. For example, it increases the mechanical strength, or the frictional resistance.

Here, the reinforcement 46 extends, in relation to the first shell 1, lengthwise from the rear end 4 to the front end 5, widthwise between the lateral side 6 and the medial side 7, as well as height-wise from the base 8 to the upper end 9. Because it is associated with a tightening device 48, not described in detail as it is known to one with ordinary skill in the art, the reinforcement 46 contributes to an effective foot support in the article of footwear or shoe 47.

To facilitate walking or running, the article of footwear 47 comprises an outer sole assembly 49, which can consist of a single piece or it can be comprised of multiple pieces.

Although not shown in the drawing, the article of footwear 47 comprises an inner sole assembly to improve comfort and hygiene of the foot.

Finally, with reference to all of FIGS. 1 to 10, the first shell 1 has three zones 51, 52, 53 with different mechanical properties. These zones differ from one another due, for example, to variations in the percentage of the hot-melt fibers. However, a different number of zones can be provided.

The other embodiments of the invention are summarized below with reference FIGS. 11 to 14. For reasons of convenience, it is mainly the differences from the first embodiment that are highlighted. In addition, the same reference numerals are used for the same or similar elements seen in the first embodiment.

Figure 11:
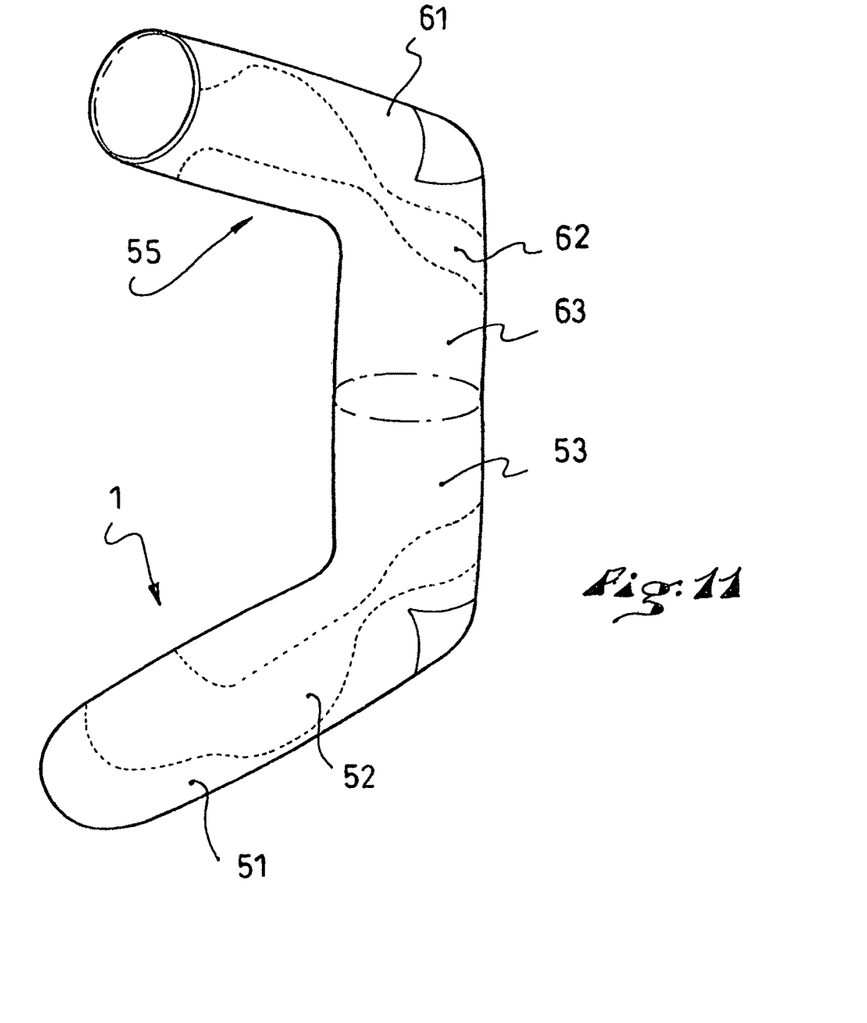
FIG. 11 is a perspective view of a sleeve configured to form a first shell and a second shell of an article of footwear, according to a second embodiment of the invention.

As shown in FIG. 11, for the second embodiment, the article of footwear 47 includes the first shell 1 and a second shell 55. These shells are configured to be opposite one another for the making of the article of footwear 47. In a non-limiting manner, they are made with the same sleeve which, once folded, allows the overlapping, that is, the positioning of one opposite the other.

In a non-limiting manner, the second shell 55 also has three zones 61, 62, 63 with different mechanical or physical properties.

Figure 12:
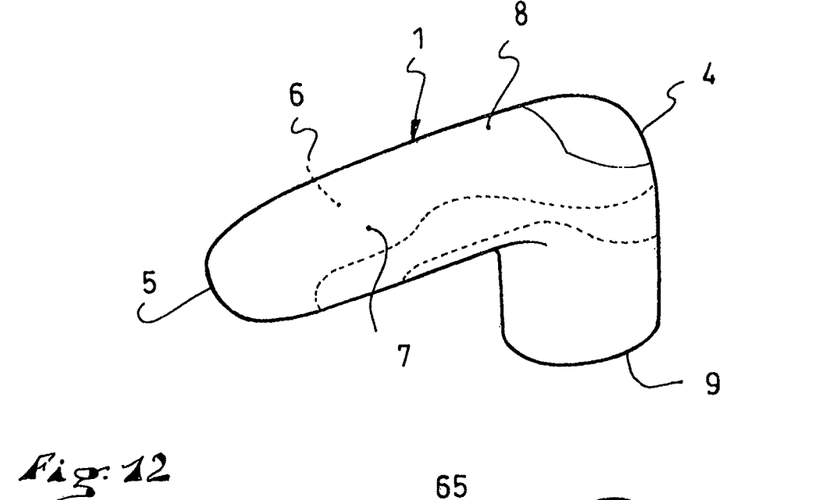
FIG. 12 is a view similar to FIG. 5, according to a third embodiment of the invention.

As shown in FIG. 12, for the third embodiment, the support 21 demarcates at least one passage 65 for circulation of a fluid. In other words, the support 21 is porous, somewhat in the manner of a sponge or a pumice stone, which allows for a more uniform suction of the air trapped in the membrane. The application of the shell 1 onto the support 21 is only better.

Figure 13:
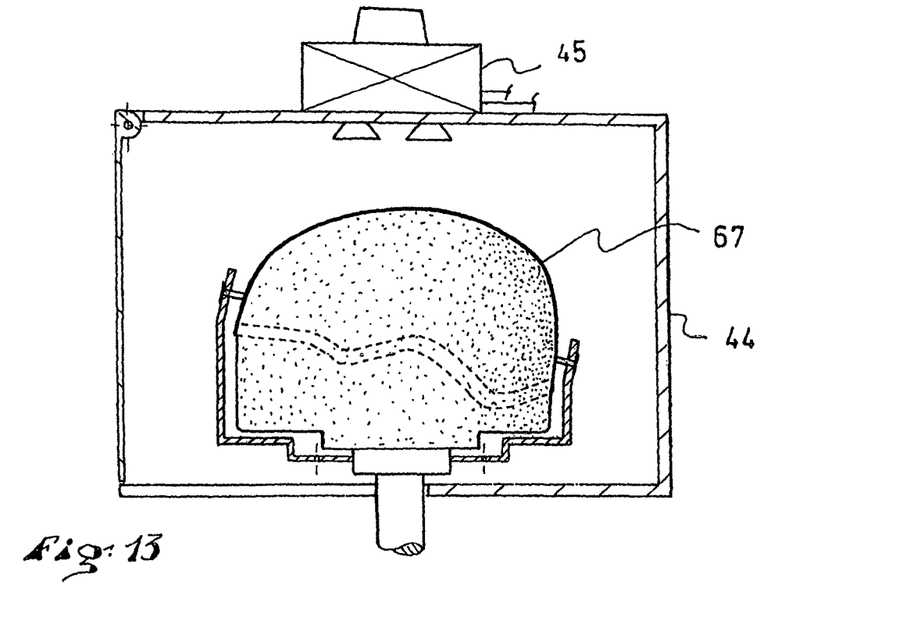
FIG. 13 is a view similar to FIG. 9, for a fourth embodiment of the invention.

As shown in FIG. 13, for the fourth embodiment, the hollow object is a protective article, such as a helmet 67.

Figure 14:
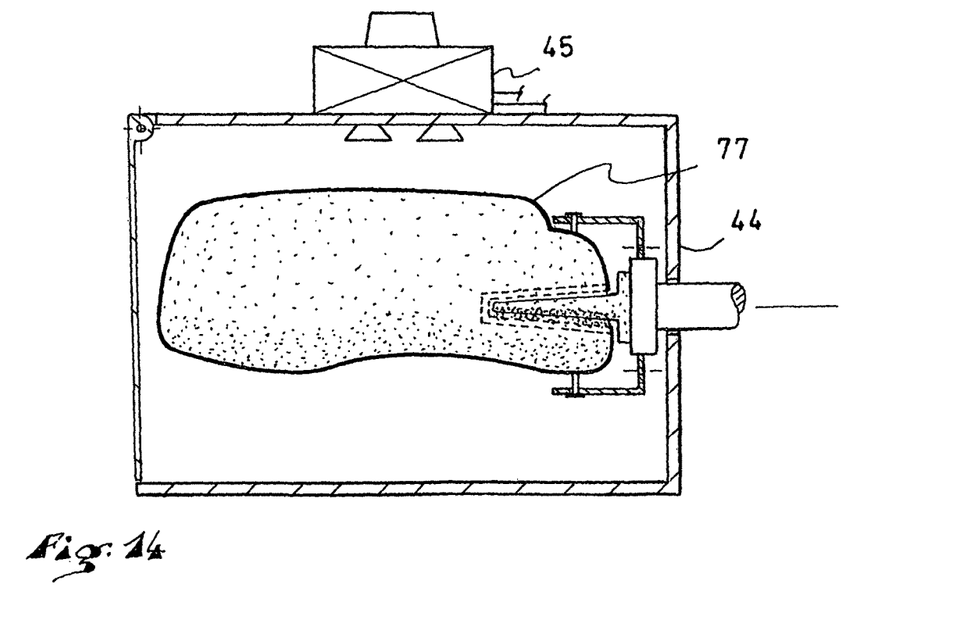
FIG. 14 is a view similar to FIG. 9, for a fifth embodiment of the invention.

As shown in FIG. 14, for the fifth embodiment, the hollow object is a bag 77, for example a backpack.

The invention is not limited to the embodiments described above, and includes all technical equivalents that fall within the scope of the claims that follow.

In particular, it can be provided to add one or more shells to the article of footwear 47.

The reinforcement can be provided to be located outside of the article of footwear, thereby covering all of the shells, directly or indirectly.

A different number than three can be provided for the zones of the shells with different mechanical or physical properties. For example, there can be one, two, four, five, or more.

Adhesive filaments or threads can also be included in the structure of the sleeve and, therefore, in each shell 1, 55. The adhesive acts by melting, for example to affix the shells to one another, in order to affix the reinforcement 46 to a shell, possibly to affix an inner liner to the first shell, or an outer protective layer to the second shell or to the first shell. Finally, in this case, at least one shell comprises hot-melt adhesive filaments or threads.

It should also be noted that one or more decorative markings can be applied onto a shell 1, 55. Each marking can result, for example, from a raised or recessed imprint on the support 21.

Management of the pressure exerted on the membrane can result from two combined techniques, one coming from the first embodiment, and the other from the third embodiment.

It is also possible to use not just one membrane having a shape similar to that of the object, but a plurality of membranes with different forms than that of the object.

The invention claimed is:

1. A method for manufacturing a hollow object, from a material comprising threads mechanically bonded to one another to form a first shell, the method comprising:
   shaping the first shell on a support;
   subsequent to said shaping, covering the first shell with a sealed membrane, the membrane having opposite sides that include a first-shell-contacting surface and a free surface opposite the first-shell-contacting surface;
   creating a pressure difference on the opposite sides of the membrane, pressure on the first-shell-contacting surface of the membrane being less than pressure on the free surface of the membrane; and
   simultaneous with or following the covering of the first shell, causing a change of state and/or the bonding of a plurality or all of the threads of the first shell;
   wherein:
   the hollow object is an article of footwear; and
   the first shell extends lengthwise from a rear end to a front end, widthwise between a lateral side and a medial side, and height-wise from a base to an upper end.

2. A method according to claim 1, wherein:
the creating a pressure difference on the opposite sides of the membrane comprises reducing pressure on the first-shell-contacting surface side of the membrane.

3. A method according to claim 1, wherein:
the creating the pressure difference on the opposite sides of the membrane comprises increasing pressure on the side of the free surface side of the membrane.

4. A method according to claim 1, wherein:
the creating the pressure difference on the opposite sides of the membrane comprises both of the following:
   reducing pressure on the first-shell-contacting surface side of the membrane; and
   increasing pressure on the side of the free surface side of the membrane.

5. A method according to claim 1, wherein:
at least a plurality of the threads comprises at least one hot-melt filament.

6. A method according to claim 5, wherein:
the causing a change of state and/or the bonding of a plurality or all of the threads of the first shell is carried out by supplying energy.

7. A method according to claim 1, wherein:
the causing a change of state and/or the bonding of a plurality or all of the threads of the first shell is carried out by increasing temperature.

8. A method according to claim 7, wherein:
the increasing temperature is carried out by radiation.

9. A method according to claim 7, wherein:
the increasing temperature is carried out by convection.

10. A method according to claim 7, wherein:
the increasing temperature is carried out by conduction.

11. A method according to claim 1, wherein:
the membrane has a shape substantially of the object.

12. A method according to claim 1, wherein:
the membrane comprises an elastically reversibly deformable synthetic material.

13. A method according to claim 1, further comprising:
incorporating a reinforcement onto the article of footwear.

14. A method according to claim 13, wherein:
the article of footwear comprises the first shell and a second shell.

15. A method according to claim 13, wherein:
the reinforcement extends, in relation to the first shell, lengthwise from the rear end to the front end, widthwise between the lateral edge and the medial edge, and height-wise from the base to the upper end.

16. A method according to claim 13, wherein:
the first shell has three zones with different mechanical properties.

17. A method according to claim 14, wherein:
the second shell has three zones with different mechanical properties.

18. A method according to claim 13, wherein:
the article of footwear comprises an outer sole assembly.

19. A method according to claim 13, wherein:
the article of footwear comprises an inner sole assembly.

20. A method for manufacturing a hollow object, from a material comprising threads mechanically bonded to one another to form a first shell, the method comprising:
   shaping the first shell on a support;
   subsequent to said shaping, covering the first shell with a sealed membrane, the membrane having opposite sides that include a first-shell-contacting surface and a free surface opposite the first-shell-contacting surface;
   creating a pressure difference on the opposite sides of the membrane, pressure on the first-shell-contacting surface of the membrane being less than pressure on the free surface of the membrane; and
   simultaneous with or following the covering of the first shell, causing a change of state and/or the bonding of a plurality or all of the threads of the first shell;
   wherein the hollow object is a helmet.

21. A method for manufacturing a hollow object, from a material comprising threads mechanically bonded to one another to form a first shell, the method comprising:
   shaping the first shell on a support;
   subsequent to said shaping, covering the first shell with a sealed membrane, the membrane having opposite sides that include a first-shell-contacting surface and a free surface opposite the first-shell-contacting surface;
   creating a pressure difference on the opposite sides of the membrane, pressure on the first-shell-contacting surface of the membrane being less than pressure on the free surface of the membrane; and
   simultaneous with or following the covering of the first shell, causing a change of state and/or the bonding of a plurality or all of the threads of the first shell;
   wherein the hollow object is a bag.

22. A method according to claim 1, wherein:
the support demarcates at least one passage configured for circulation of a fluid.

23. A product comprising the object manufactured according to the method of claim 1.

24. A method for manufacturing a hollow object, from a material comprising threads mechanically bonded to one another to form a first shell, the method comprising:
   shaping the first shell on a support;
   subsequent to said shaping, covering the first shell with a sealed membrane, the membrane having opposite sides that include a first-shell-contacting surface and a free surface opposite the first-shell-contacting surface;
   creating a pressure difference on the opposite sides of the membrane, pressure on the first-shell-contacting surface of the membrane being less than pressure on the free surface of the membrane;

simultaneous with or following the covering of the first shell, causing a change of state and/or the bonding of a plurality or all of the threads of the first shell; and incorporating a reinforcement to the object.

25. A method for manufacturing a hollow object, from a material comprising threads mechanically bonded to one another to form a first shell, the method comprising:

shaping the first shell on a support;

subsequent to said shaping, covering the first shell with a sealed membrane, the membrane having opposite sides that include a first-shell-contacting surface and a free surface opposite the first-shell-contacting surface;

creating a pressure difference on the opposite sides of the membrane, pressure on the first-shell-contacting surface of the membrane being less than pressure on the free surface of the membrane;

simultaneous with or following the covering of the first shell, causing a change of state and/or the bonding of a plurality or all of the threads of the first shell; and wherein the support is porous to facilitate circulation of a fluid to facilitate application of the first shell onto the support.

\* \* \* \* \*